United States Patent [19]

Roush

[11] 4,426,093
[45] Jan. 17, 1984

[54] STEM PACKING WITH SLITTED FLEXIBLE POLYMER SLEEVE

[76] Inventor: Walter T. Roush, 5606 Valerie St., Houston, Tex. 77081

[21] Appl. No.: 459,337

[22] Filed: Jan. 20, 1983

[51] Int. Cl.³ .................... F16J 15/20; F16K 41/04
[52] U.S. Cl. ........................... 277/110; 277/188 A; 277/208; 251/214
[58] Field of Search ............... 277/110, 111, 152, 153, 277/188 A, 207 R, 208; 251/214

[56] References Cited

U.S. PATENT DOCUMENTS

| 2,097,016 | 10/1937 | Bowen | 277/208 X |
| 2,717,273 | 9/1955 | Anderson | 277/208 X |
| 3,206,165 | 9/1965 | Salmon et al. | 251/214 X |

FOREIGN PATENT DOCUMENTS

| 492954 | 9/1938 | United Kingdom | 277/152 |
| 528208 | 10/1940 | United Kingdom | 277/110 |
| 1028764 | 5/1966 | United Kingdom | 251/214 |

Primary Examiner—Robert S. Ward

[57] ABSTRACT

An improved stem packing. In the preferred and illustrated embodiment, the packing for the stem is captured within a housing normally described as a bonnet assembly, and is axially loaded by a cooperative jam nut and bushing. They axially load the top end of the stem packing, forcing it to expand radially inwardly and outwardly to grip the stem to seal against stem and bonnet surfaces. Extrusion of packing material typically occurs. The improved version of stem packing apparatus in the preferred and illustrated embodiment is a tubular sleeve of relatively elongate lubricated plastic material having a plurality of partial circumferential parallel cuts in it, thereby decreasing the axial load required to achieve sealing. The seal material controllably expands controlled by the cuts, thereby achieving the desired internal and external seal to prevent leakage. Torque required to rotate the stem is reduced, and extrusion of the seal material is markedly reduced.

5 Claims, 3 Drawing Figures

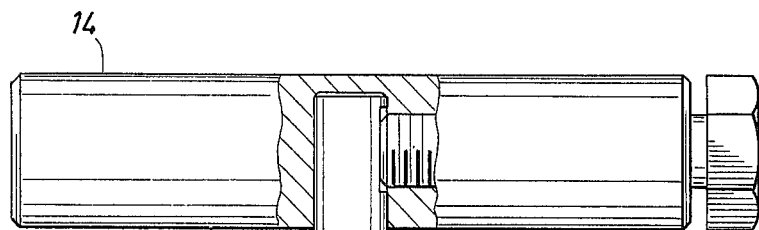
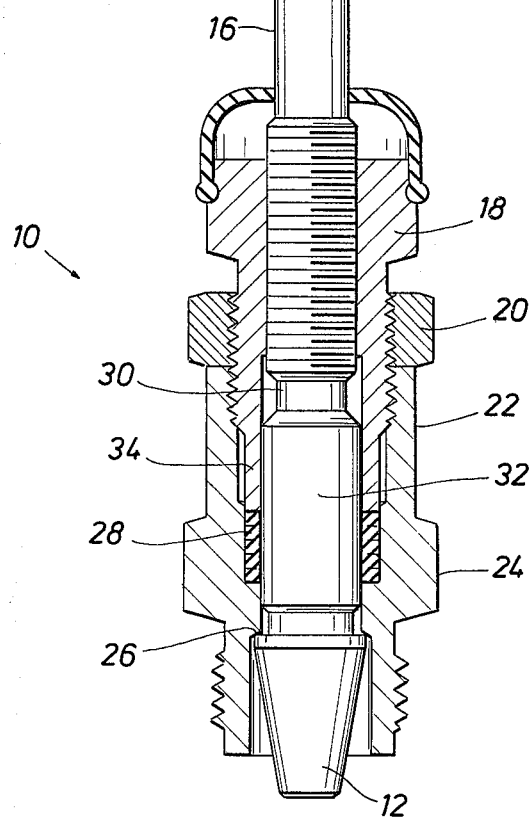
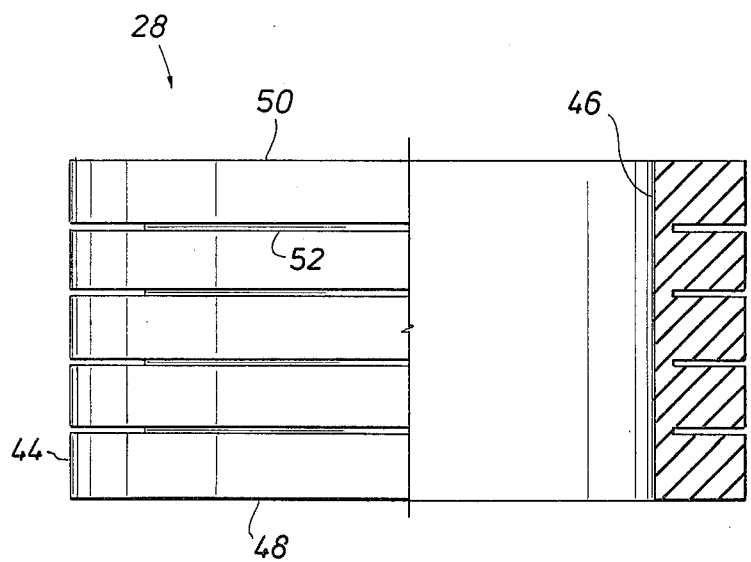

STEM PACKING WITH SLITTED FLEXIBLE POLYMER SLEEVE

BACKGROUND OF THE DISCLOSURE

In relatively inexpensive hand operated valves, typical valve construction requires positioning a valve stem packing around the stem. This packing surrounds the stem of the valve to prevent leakage along the stem. The packing is normally held in place within a bonnet assembly. The packing is axially loaded with a jam nut and bushing cooperative with the bonnet, this axially loading being necessary to radially expand the seal material and achieve sealing. Several undesirable aspects of this axial loading should be observed. First of all, the axial loading on the seal material forces the seal material to cold flow and it is extruded along the stem. If the pressure is high enough, the axial loading can force sufficient portions of the sealed material through the narrow encircling gap around the stem in the surrounding bonnet. This factor alone can limit the life of a seal.

Separate from this, the loading which is placed on a tubular sleeve used for isolation purposes forces the sleeve into a slightly distorted form. The form is described generally as bulging. Because the sleeve has significant length compared to the radial thickness of the sleeve, the bulges have the form of a wavy pattern, this pattern prevailing fully around the sleeve, thereby forming on a typical sleeve uneven wear surfaces in contact with the stem on the interior and a correspondingly offset encircling areas in contact with the surrounding bonnet. The wear is highly localized in the areas in contact with the stem. The undulations observed in the axially loaded sleeve are damaging to it, and create a localized surface damage amd wear. Leakage more often results with wear.

The later problem can be reduced by placing more load on the seal, and thereby further swelling the sleeve. This broadens the areas of contact on both sealing surfaces; it also increases the rate at which the sleeve material is extruded into the encircling gap around the stem.

Another problem arises in that changes in service cannot be accomodated so readily. For instance, one change in service results from a change in pressure requirements. Should the pressure requirements go up, the seal may not hold against the increased pressure. Rather, the increase in pressure can be resisted by increasing the loading on the seal. However, as the loading is increased, the life of the seal declines more rapidly. Softer seal material can be used and is quite acceptable for a short period of time, or a few operations of the valve. Long term use cannot be sustained with a soft seal material.

The seal of this disclosure is a marked improvement. It is able to overcome many of these limitations. In particular, it achieves sealing with a marked reduction in force. This reduces the bushing torque required. Moreover, the torque required on operation of the handle connected to the stem is reduced; this reduction decreases polishing or work hardening of the parts at their contact area.

With the foregoing in view, the present disclosure sets forth a seal mechanism which comprises an elongate hollow tubular sleeve formed of a flexible polymer material having slick faces, and is sliced into a plurality of thin parallel washers joined at the inner edge. The slices or cuts do not pass all the way through; they lack about 0.005 inches or slightly more from passing through the tubular sleeve, and the cuts enable the sleeve to act as a loose stack of washers or rings, each individually expanding. The several portions isolated by the cuts are able to deflect outwardly with a slight bow or bulge between cuts. At the cuts, the inside face adjacent to the stem bulges to form external and internal sealing edges.

In this manner, the device perfects a stem seal with reduced axially loading, thereby permitting reduced handle torque installation of a single stack or cartridge rather than several loose pieces reduces assembly and maintenance time and minimizes damage to seal parts.

BRIEF DESCRIPTION OF THE DRAWINGS

So that the manner in which the above recited features, advantages and objects of the present invention are attatined and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limting of its scope, for the invention may admit to other equally effective embodiments.

FIG. 1 is a sectional view through a valve stem protected with the modified stem seal of this disclosure;

FIG. 2 is a view of the packing with a portion broken away to show details of construction of the stemmed seal; and FIG. 3 is a partial view similar to FIG. 2 showing an exaggerated curvature formed on reduced loading whereby sealing is accomplished by the stem seal.

DETAILED DESCRIPTION OF THE PREFERRED EMBODIMENT

Attention is first directed to FIG. 1 of the drawings which sets out the context in which the present invention is implemented. In FIG. 1, the numeral 10 identifies a stem operated valve having a valve element in the form of a tapered plug 12. It cooperates with a seat (not shown) and is forced downwardly into the seat to complete a seal. A handle 14 is rotated to rotate a stem 16 attached to the handle. The stem is threaded to a hollow bushing 18. The hollow bushing surrounds the stem and threads to it, at least at the upper portion of the bushing, and the bushing extends on the interior of a jam nut 20. The nut 20 fits on the exterior of the bushing. The bushing threads on the inside of a bonnet 22. The bonnet 22 is axially hollow and surround the members which are concentrically arranged in the passage around the stem 16. The bonnet 22 is constructed of a hollow cylindrical body with suitable wrench flats at 24 to enable it to be threaded to the valve body, thereby positioning the valve element 12 in cooperation with the valve seat. The valve element is normally a plug or ball, and is a tapered plug in FIG. 1. The valve element 12 is shown at the upper range of its travel, this range being limited by shoulder 26. The shoulder 36 is an internally protruding projection within the axial passage.

The shoulder 26 supports a seal assembly 28 in accordance with the teachings of this disclosure. The seal fits around the stem. The stem is threaded at the upper portions above a narrow neck 30 and is smooth below the neck 30. This smooth portion is identified by the numeral 32 and this portion is in contact with the stem seal 28. The bushing 18 threads to the stem. The bushing is held stationary by the jam nut and the stem is permitted to rotate, thereby advancing or retracting the valve element 12. The bushing 18 incorporates an elongate lower skirt 34 which extends to the upper end of the stem seal 28 to compress it. The position of the skirt 34 is dependent on the number of turns applied to makeup the components in threading the bushing and jam nut into the bonnet.

As a practical matter, there is a small gap which cannot be easily shown in the drawings. This gap is found below and above the stem seal 28. At the bottom, there is a gap between the bonnet and the stem, at the top there is a gap between the stem sealing surface and the bushing skirt. The flowable material used in fabrication of most stem seals can flow into this gap and is extruded if excessive pressure is applied to the material making up the stem seal. Another practical observation regarding this construction is that there is no rotating movment between the bonnet and bushing except at the time of assembly; even so, there is a gap at that juncture which also might permit extrusion of the plastic material into this gap. These gaps are noted because they pose a practical problem in the manufacture and assembly of stem operated valves with typical stem seals utilized heretofore. It will be further observed that the stem seal 28 has an innerface which is contacted with the rotating stem and an outer face which must seal against the bonnet. Otherwise, leakage along the stem from the area of the valve element 12 can occur along either of these two paths. It is desirable that the stem seal therefore seal these two paths.

Attention is next directed to FIG. 2 of the drawings where the stem seal 28 is shown enlarged. It comprises a hollow cylindrical body having the form of a sleeve. It is constructed with an outer smooth face 44 and a smooth inner face 46. The two cylindrical faces are concentric to one another. It is made of relatively thin stock. It is formed into a right cylindrical body by parallel end faces 48 and 50. The parallel end faces are parallel to a set of preferably evenly spaced partial cuts 52. The cuts are similar to one another and are identified by common reference numeral. The preferable material is Teflon or other fluorocarbons suitable for use as a relatively slick faced seal body. Preferably, a temperature of up to perhaps 100° C. or higher is permitted, all dependent on the choice of fluorocarbon. Also, filler material can be incorporated in the plastic but this is a matter of maintaining the characteristics desired. The desired characteristics relate to the ability to hold shape at an elevated temperature range (above room temperature), the ability to sustain the required slick surface, and the ability to yield without detrimental plastic flow. Some plastic flow is helpful to initiate a good seal. Inevitably, plastic flow will occur and a set will be taken but it has been discovered that Teflon seals of this construction provide relatively good performance without distorting unduly. However, a solid Teflon seal constructed in the manner disclosed herein without the cuts which will be described below has a markedly limited life in contrast with the stem seal of this disclosure.

There are several cuts. They do not have to be wide; rather, very thin cuts of the sort that would be made by a razor edge will suffice. The cuts are preferably perpendicular to the major axis of the body, and the cuts are preferably parallel to one another, evenly spaced and are made to a common depth. In one version of the seal adapted for a stem of approximately 5/16 inch in diameter, the cuts leave a depth of about 0.005 to about 0.010 inches. That is, the cuts do not pass all the way through the wall to the stem. For a stem seal of this size, this thickness remained and seemed to have significance in the operation of the device.

The parallel cuts enable the device to function in the following manner. When axially loading is applied as by tightening the bushing into the bonnet (see FIG. 1), loading of the seal occurs. FIG. 3 shows in dotted line a modest bulge which occurs at the outer face and a different bulge which occurs on the inner face. They have been exaggerated for purposes of illustration. The bulge on the outer face seals in contact with the surrounding bonnet and thereby prevents leakage along the outer face. Because the cut fully encircles and the bulge is parallel to the cuts, full encirclement and sealing is accomplished to thereby fully seal against leakage. The same is true on the interior surface. However, the bulge is axially displaced on the inner surface, and is aligned with the cut. It is conjectured that the cut localizes stress loading in compression and causes the slight bulge to be located adjacent to the cut. This loading is advantageous because it forms a bulge which fully encircles the stem and seals against it.

The dotted line bulge drawn in FIG. 3 is something of an exaggeration. Its height is limited by the spacing between parallel cuts. It appears that the optimum spacing range is perhaps 1/32 to 1/16 inches. It will be appreciated that this applies to a stem seal typically having a stem diameter of around 5/16 inch or so. Greater spacing can be accommodated but the bulge is changed if the parallel cuts are further apart. To this end, the incorporation of four or five parallel cuts a this spacing forms the several parallel bulges to achieve good sealing with reduced loading.

As an example, consider a stem operated valve which rotates four or five turns from the fully open to the fully closed position wherein the stem is approximately 5/16 inch in diameter and the seal is about ¼ inches in length, and the maximum line pressure to be sealed is a nominal 6,000 PSI. Through the use of the stem seal 28 of this disclosure, sealing was perfected with markedly reduced axial loading on the stem seal. This loading was reflected by reduction of approximately 50% in the torque required to operate the handle while sustaining leak prevention along the stem. This 50% reduction in turning torque is significant because it also indicates that the seal will have markedly longer life, being exposed to reduced wear and polishing on the inner face to normally found in heavy loading. One valuable advantage is that the stack of seal washers of this disclosure is easy to install or remove. A tall stack is handled readily, much easier than several loose or disjointed washers.

While the foregoing is directed to the preferred embodiment and sets forth a full and complete description of one version of the stem seal for a particular size, the scope of the present disclosure determined by the claims which follow.

What is claimed is:

1. A stem seal assembly to be placed around a stem in a valve having a bonnet with a cavity for receiving a stem seal therein in surrounding relationship to a stem passing through said bonnet, and a bushing having a protruding lower skirt adapted to contact the stem seal in the cavity to radially expand for sealing, the stem seal comprising an elongate hollow cylindrical tubular body having an outer face and an inner face, and which stem seal is formed of an elastomeric material having sealing characteristics at surface in contact with the bonnet and stem, said stem seal further incorporating a plurality of parallel cuts from the outer face toward the inner face to a specified depth further defining a thin wall at the end of the cuts adjacent to the inner wall of the cylindrical body, and wherein this thin wall has a thickness of about 0.005 inches or greater.

2. The apparatus of claim 1 wherein the thin wall ranges from about 0.005 to about 0.010 inches thick.

3. The apparatus of claims 1 or 2 wherein the parallel cuts are in the range of 1/32 to 1/16 inches apart and are parallel to one another.

4. The apparatus of claims 1 or 2 wherein the parallel cuts are evenly spaced.

5. The apparatus of claims 1 or 2 wherein said cylindrical body forms bulges on loading at said cuts at the inner face thereof and bulges between cuts at the outer face thereof; and said cuts are parallel and evenly spaced from one another, and are about 0.005 to about 0.010 inches from the inner face.

* * * * *